(12) United States Patent
Oh et al.

(10) Patent No.: US 9,486,773 B2
(45) Date of Patent: Nov. 8, 2016

(54) HIERARCHICAL STRUCTURE OF GRAPHENE-CARBON NANOTUBES AND METHOD FOR PREPARING SAME

(71) Applicant: KOREA ADVANCED INSTITUTE OF SCIENCE AND TECHNOLOGY, Daejeon (KR)

(72) Inventors: Il-Kwon Oh, Daejeon (KR); Hyun-Jun Kim, Daejeon (KR); Seok-Hu Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 25 days.

(21) Appl. No.: 14/361,067

(22) PCT Filed: Dec. 5, 2012

(86) PCT No.: PCT/KR2012/010479
§ 371 (c)(1),
(2) Date: May 28, 2014

(87) PCT Pub. No.: WO2014/007440
PCT Pub. Date: Jan. 9, 2014

(65) Prior Publication Data
US 2015/0107985 A1    Apr. 23, 2015

(30) Foreign Application Priority Data

Jul. 4, 2012    (KR) .................. 10-2012-0073032

(51) Int. Cl.
*B01J 19/12* (2006.01)
*C01B 31/02* (2006.01)
*C01B 31/04* (2006.01)

(52) U.S. Cl.
CPC ............ *B01J 19/126* (2013.01); *C01B 31/022* (2013.01); *C01B 31/0446* (2013.01); *C01B 2202/08* (2013.01)

(58) Field of Classification Search
CPC ............ B01J 19/126; C01B 31/0446; C01B 31/0233; C01B 31/022; C01B 2202/08
USPC .......................... 204/157.43, 157.47
See application file for complete search history.

(56) References Cited

U.S. PATENT DOCUMENTS

| | | | |
|---|---|---|---|
| 7,754,054 B2 * | 7/2010 | Mitra ............... | C01B 31/0213 204/157.15 |
| 9,249,022 B2 * | 2/2016 | Oh ................... | B01J 19/12 |

(Continued)

FOREIGN PATENT DOCUMENTS

| | | |
|---|---|---|
| KR | 10-2008-0059545 | 6/2008 |
| KR | 10-2011-0119270 | 11/2011 |

OTHER PUBLICATIONS

Janowska et al, "Catalytic unzipping of carbon nanotubes to few-layer graphene sheets under microwaves irradiation," Applied Catalysis A: General 371 (2009) pp. 22-30.*

(Continued)

*Primary Examiner* — Keith Hendricks
*Assistant Examiner* — Colleen M Raphael
(74) *Attorney, Agent, or Firm* — Lex IP Meister, PLLC

(57) ABSTRACT

The present invention relates to a hierarchical structure of graphene-carbon nanotubes and a method for preparing the same, and, more specifically, to a method for growing graphene into carbon nanotubes having a hierarchical structure by adding metal nanoparticles on the graphene. According to the present invention, carbon nanotubes having a hierarchical structure, which have an increased specific surface area compared to existing carbon nanotubes, can be obtained, and a carbon nanotube structure which is metal-functionalized by a metal precursor can be obtained. In addition, carbon nanotubes can be prepared in an environmentally-friendly manner by the use of microwaves.

9 Claims, 3 Drawing Sheets

(56) References Cited

U.S. PATENT DOCUMENTS

| | | | | |
|---|---|---|---|---|
| 2006/0121279 A1* | 6/2006 | Petrik | C01B 31/0233 | 428/403 |
| 2007/0101824 A1* | 5/2007 | Drzal | C01B 31/02 | 75/345 |
| 2008/0280751 A1* | 11/2008 | Harutyunyan | C01B 31/0233 | 502/87 |
| 2013/0063296 A1* | 3/2013 | Hennig | H01Q 1/245 | 342/1 |

OTHER PUBLICATIONS

Xin et al, "A graphene sheet exfoliated with microwave irradiation and interlinked by carbon nanotubes for high-performance transparent flexible electrodes," Nanotechnology vol. 21 (2010) 405201 (7pp), doi:10.1088/0957-4484/21/40/405201.*

Yang et al, "Preparation and electrochemistry of graphene nanosheets-multiwalled carbon nanotubes hybrid nanomaterials as Pd electrocatalyst support for formic acid oxidation," Electrochmica Acta, vol. 62 (2012) pp. 242-249, available online Dec. 16, 2011.*

Lv et al, "Enhanced photocatalytic degradation of methylene blue by ZnO-reduced graphene oxide-carbon nanotube composites synthesized via microwave-assisted reaction," Catal. Sci. Technol., 2012, 2, 2297-2301 (accepted 30th May 2012).*

Dorothea Marquardt, et al., "The use of microwave irradiation for the easy synthsis of graphene supported transition metal nanoparticles in ionic liquids", Carbon. vol. 49, pp. 1326-1332. (Dec. 4, 2010).

Guoping Xin et al., "A graphene sheet exfoliated with microwave irradiation and interlinked by carbon nanotubes for high performance transparent flesible electrodes", Nanotechnology, vol. 21, 405201, pp. 1-7 (Sep. 8, 2010).

Ying-Jie Zhu, et al., "Microwave assisted synthesis of single crystalline tellurium nanorods and nanowires in ionic liquids", Angew. Chem. Int. Ed., vol. 43, pp. 1410-1414. (Mar. 2004).

* cited by examiner

HIERARCHICAL STRUCTURE OF GRAPHENE-CARBON NANOTUBES AND METHOD FOR PREPARING SAME

TECHNICAL FIELD

The present invention relates to a graphene-carbon nanotube hierarchical structure and a manufacturing method thereof, and in detail, relates to a method generating a carbon nanotube having a hierarchical structure by adding a metal nano-particle on a graphene.

BACKGROUND ART

A future electric/electronic element must be light and flexible and be realized in a portable shape to be applied to a wearable computer, a flexible display, a flexible IC card, a flexible portable solar cell, and an artificial muscle.

To develop the future electric/electronic element, research on making a three-dimensional conductor through fusion of one-dimensional carbon nanotubes to graphene of a two-dimensional shape conductor and activating it to an electronic element having a flexible and transparent characteristic is actively ongoing.

Conventionally, a nanostructure in which graphene and carbon nanotubes are combined to be used as a conductive structure is obtained by using a chemical vapor deposition (CVD) method, however when applying the CVD method, since a high temperature and high pressure condition is used, and a particular raw material must be processed, a danger exists, and several complicated steps are required such that considerable time and cost for manufacturing the nanostructure are required.

The above information disclosed in this Background section is only for enhancement of understanding of the background of the invention and therefore it may contain information that does not form the prior art that is already known in this country to a person of ordinary skill in the art.

DISCLOSURE

Technical Problem

An exemplary embodiment of the present invention provides a method of manufacturing a carbon nanotube having a hierarchical structure of a large amount by irradiating microwaves during a short time without oxidation and reduction of graphite. An exemplary embodiment of the present invention provides a hierarchical structure of an environmentally-friendly graphene-carbon nanotube suppressing overuse of a dangerous organic solvent, and a manufacturing method thereof.

Technical Solution

The present invention provides a manufacturing method of a hierarchical structure of a graphene-carbon nanotube, including: adding a first catalyst metal and a first ion solvent to a graphite or a graphene oxide to provide a first mix material; irradiating first microwaves to the first mix material to provide a graphene-carbon nanotube conjugate; adding a second catalyst metal and a second ion solvent to the graphene-carbon nanotube conjugate to provide a second mix material; and irradiating second microwaves to the second mix material to convert the carbon nanotube into a hierarchical structure.

The first catalyst metal may be ground and added in the step of providing the first mix material.

In the step of providing the first mix material, the graphite or the graphene oxide, the first catalyst metal, and the first ion solvent may be mixed by ultrasonic wave processing.

In the step of providing the second mix material, the second catalyst metal and the second ion solvent may be mixed to the graphene-carbon nanotube conjugate by ultrasonic wave processing.

In the step of providing the first mix material, the graphite or the graphene oxide and the first catalyst metal may be mixed in a ratio of 1:0.05 to 1:20.

In the step of providing the first mix material, the graphite or the graphene oxide and the first ion solvent may be mixed in a ratio of 1:0.1 to 1:20.

In the step of converting the carbon nanotube into the hierarchical structure, the second microwaves may be irradiated with an intensity of 100 W to 2000 W during 1 second to 1000 seconds.

The first catalyst metal or the second catalyst metal may be at least one metal selected from a group including palladium (Pd), nickel (Ni), cobalt (Co), and iron (Fe).

The first ion solvent or the second ion solvent may be at least one ion solvent selected from a group including a 1-ethyl-3-methylimidazolium (EMIM)-based ion solvent and a 1-butyl-3-methylimidazolium (BMIM)-based ion solvent.

Advantageous Effects

According to the hierarchical structure of the graphene-carbon nanotube and the manufacturing method thereof according to an exemplary embodiment of the present invention, compared with a conventional carbon nanotube, the carbon nanotube of the hierarchical structure having an increased specific surface area may be obtained, and a metal functionalized carbon nanotube structure may be obtained according to a metal precursor. Also, by using the microwaves, the carbon nanotube may be manufactured by an environmentally-friendly method.

MODE FOR INVENTION

Figure 1:
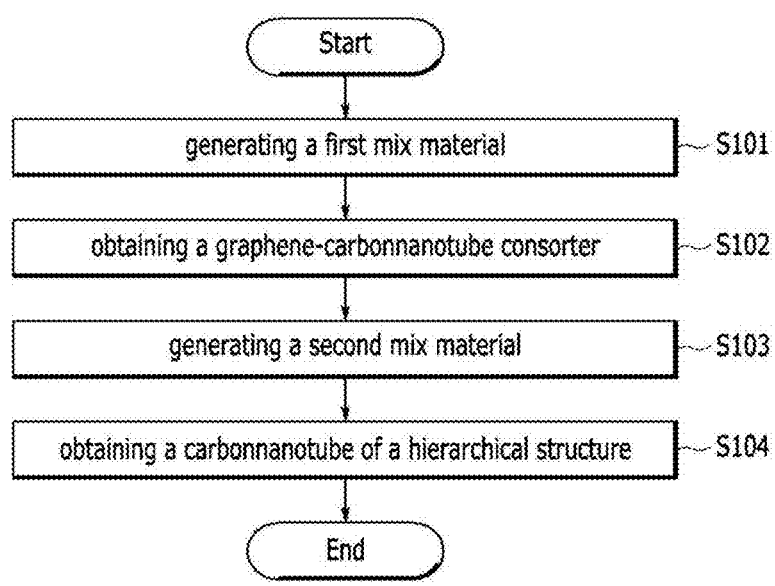
FIG. 1 is a flowchart sequentially showing a hierarchical structure manufacturing method of a graphene-carbon nanotube according to an exemplary embodiment of the present invention.

FIG. 1 is a flowchart sequentially showing a hierarchical structure manufacturing method of graphene-carbon nanotubes according to an exemplary embodiment of the present invention.

Firstly, a first catalyst metal and a first ion solvent are added to graphite or graphene oxide and are uniformly mixed by using an ultrasonic wave disassembler to generate a first mix material (S101).

In this case, the step of generating the first mix material may include a step of grinding the first catalyst metal.

A particle size of the ground first catalyst metal is changed according to a time of irradiation of ultrasonic waves through the ultrasonic wave disassembler, and the first catalyst metal may be ground and added to have a particle size of 10 nm to 100 nm. When the particle size of the first catalyst metal is not included in this range, the first catalyst metal is not uniformly mixed with the graphite or the graphene oxide and the first ion solvent such that the carbon nanotubes may not be uniformly grown.

The first catalyst metal may be one among palladium (Pd), nickel (Ni), cobalt (Co), iron (Fe), or a combination metal thereof.

In this case, the graphite or the graphene oxide and the first catalyst metal may be mixed in a ratio of 1:0.05 to 1:20.

The first ion solvent may be a 1-ethyl-3-methylimidazolium (EMIM)-based ion solvent or a 1-butyl-3-methylimidazolium (BMIM)-based ion solvent, or a combination ion solvent thereof.

In this case, the graphite or graphene oxide and the above ion solvent may be mixed in a ratio of 1:0.1 to 1:20.

When the mixture ratio of the graphite or the graphene oxide and the first catalyst metal, and the first ion solvent, is smaller than 1:0.1 or is larger than 1:20, the carbon nanotubes may be partially grown or it may be difficult to form the hierarchical structure.

Next, the first microwaves are irradiated to the first mix material to obtain a graphene-carbon nanotube conjugate (S102).

Next, the second catalyst metal and the second ion solvent are added to the graphene-carbon nanotube conjugate and are mixed by using the ultrasonic wave disassembler to generate a second mix material (S103).

An amount of the second catalyst metal and the second ion solvent added when generating the second mix material is 10%-20% of the first catalyst metal and the second ion solvent when generating the first mix material, or is larger than this to change the carbon nanotubes into the hierarchical structure.

Finally, the second microwaves are irradiated to the second mix material to obtain the carbon nanotubes having the hierarchical structure (S104).

In this case, an irradiation time and intensity of the second microwaves may be changed according to the amount of the second catalyst metal and the second ion solvent that are added to the graphene-carbon nanotube conjugate, and the second microwaves are irradiated with intensity of 100 W to 2000 W during 1 second to 1000 seconds.

Also, in the generation of the first mix material, if the addition ratio of the first catalyst metal and the first ion solvent is larger than the ratio of the graphite or the graphene oxide in the mixture, the graphene-carbon nanotubes having the hierarchical structure may be generated by omitting a step of additionally adding the second catalyst metal and the second ion solvent.

In this case, an area of the graphene-carbon nanotubes having the hierarchical structure is changed according to the size of the graphene oxide, and the size of the graphene oxide may be determined through the ultrasonic wave grinding of the graphene oxide.

Also, the graphene-carbon nanotubes of the hierarchical structure may include linear carbon nanotubes having a width of about 10 nm to 100 nm and a length of about 10 nm to 10 μm.

Figure 2:
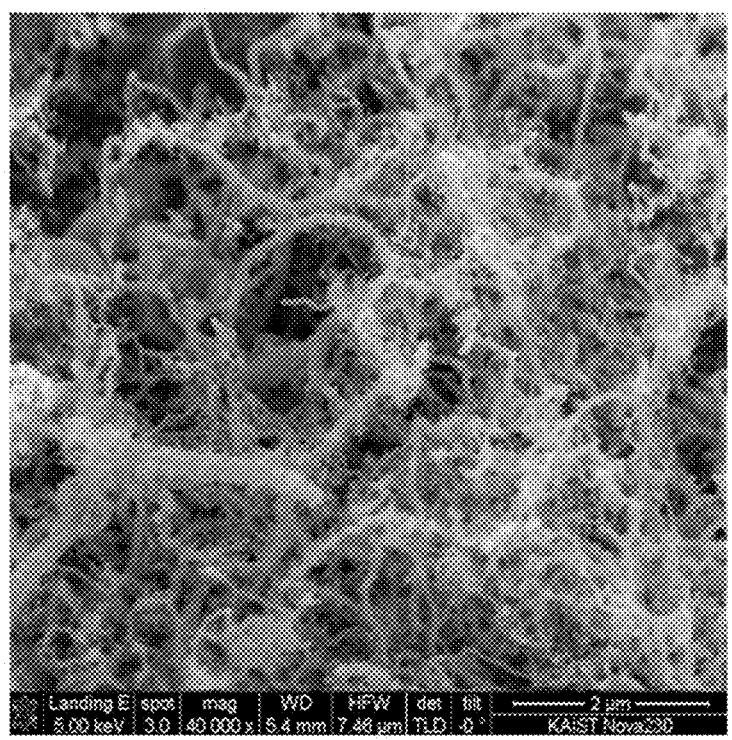
FIG. 2 is a view showing a structure in which a carbon nanotube is grown in two steps in graphene according to an exemplary embodiment of the present invention.
Figure 3:
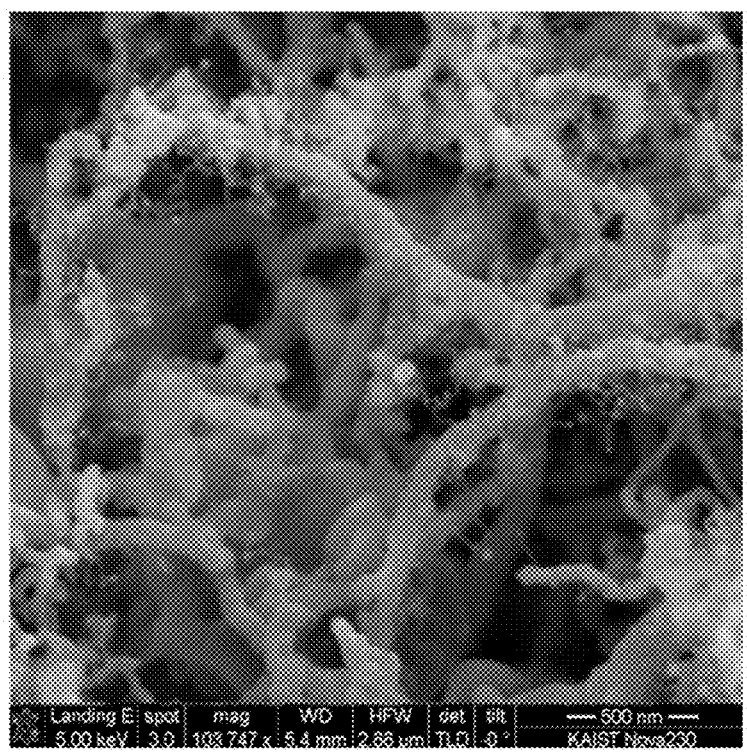
FIG. 3 is a view showing the structure of FIG. 2 at high magnification.

FIG. 2 is a view showing a structure in which carbon nanotubes are grown in two steps in graphene according to an exemplary embodiment of the present invention, and FIG. 3 is a view showing the structure of FIG. 2 at high magnification.

FIG. 2 shows the structure of the carbon nanotubes that are grown by mixing the graphene oxide, the first catalyst metal, and the first ion solvent at a ratio of 1:0.5:0.5, and the first catalyst metal of palladium (Pd) is used.

The hierarchical structure of the graphene-carbon nanotubes according to an exemplary embodiment of the present invention has an excellent electrical characteristic and low contact resistance such that the hierarchical structure may be widely applied to an electronic layer material of an electric field emission display (FED), a transparent electrode material of a flexible display, a battery, and a sensor field.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method manufacturing a hierarchical structure of a graphene-carbon nanotube, comprising:
    adding a first catalyst metal and a first ion solvent to a graphite or a graphene oxide to provide a first mix material;
    irradiating first microwaves to the first mix material to provide a graphene-carbon nanotube conjugate;
    adding a second catalyst metal and a second ion solvent to the graphene-carbon nanotube conjugate to provide a second mix material; and
    irradiating second microwaves to the second mix material to convert the carbon nanotube into a hierarchical structure.

2. The method of claim 1, wherein
the first catalyst metal is ground and added in the step of providing the first mix material.

3. The method of claim 1, wherein
in the step of providing the first mix material, the graphite or the graphene oxide, the first catalyst metal, and the first ion solvent are mixed by ultrasonic wave processing.

4. The method of claim 1, wherein
in the step of providing the second mix material, the second catalyst metal and the second ion solvent are mixed with the graphene-carbon nanotube of by ultrasonic wave processing.

5. The method of claim 1, wherein
in the step of providing the first mix material, the graphite or the graphene oxide and the first catalyst metal are mixed in a ratio of 1:0.05 to 1:20.

6. The method of claim 1, wherein
in the step of providing the first mix material, the graphite or the graphene oxide and the first ion solvent are mixed in a ratio of 1:0.1 to 1:20.

7. The method of claim 1, wherein
in the step of converting the carbon nanotube into the hierarchical structure, the second microwaves are irradiated with an intensity of 100 W to 2000 W during 1 second to 1000 seconds.

8. The method of claim 1, wherein the first catalyst metal or the second catalyst metal is at least one metal selected from a group consisting of palladium (Pd), nickel (Ni), cobalt (Co), and iron (Fe).

9. The method of claim 1, wherein the first ion solvent or the second ion solvent is at least one ion solvent selected from a group consisting of a 1-ethyl-3-methylimidazolium (EMIM)-based ion solvent and a 1-butyl -3-methylimidazolium (BMIM)-based ion solvent.

\* \* \* \* \*